(12) United States Patent
Gupta et al.

(10) Patent No.: US 11,829,987 B2
(45) Date of Patent: *Nov. 28, 2023

(54) SYSTEM AND METHOD OF FACILITATING CASH TRANSACTIONS AT AN ATM SYSTEM WITHOUT AN ATM CARD USING MOBILE

(71) Applicant: Mastercard International Incorporated, Purchase, NY (US)

(72) Inventors: Akshat Gupta, Vernon, CT (US); Ricardo Pareja, Sao Paulo (BR)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,347

(22) Filed: Jul. 19, 2022

(65) Prior Publication Data

US 2022/0351175 A1    Nov. 3, 2022

Related U.S. Application Data

(63) Continuation of application No. 17/090,524, filed on Nov. 5, 2020, now Pat. No. 11,423,386, which is a
(Continued)

(51) Int. Cl.
*G06Q 40/00* (2023.01)
*G06Q 20/32* (2012.01)
*G06Q 20/10* (2012.01)

(52) U.S. Cl.
CPC ..... *G06Q 20/3221* (2013.01); *G06Q 20/1085* (2013.01)

(58) Field of Classification Search
CPC ......... G06Q 40/00; G06Q 20/10; G06Q 20/32
(Continued)

(56) References Cited

U.S. PATENT DOCUMENTS

| | | | |
|---|---|---|---|
| 5,650,604 | A | 7/1997 | Marcous et al. |
| 6,045,039 | A | 4/2000 | Stinson et al. |

(Continued)

FOREIGN PATENT DOCUMENTS

| | | |
|---|---|---|
| CN | 101882343 A | 11/2010 |
| WO | WO-2012/177988 A1 | 12/2012 |

(Continued)

OTHER PUBLICATIONS

Design of Embedded Based Dual Identification ATM Card Security System; 2019 9th International Conference on Emerging Trends in Engineering and Technology—Signal and Information Processing (ICETET-SIP-19) (pp. 1-5); Priyanka Hemant Kale, K. K. Jajulwar. (Year: 2019).*

(Continued)

*Primary Examiner* — Tien C Nguyen
(74) *Attorney, Agent, or Firm* — Townsend & Lockett, LLC; Reshaun Finkley

(57) ABSTRACT

A system, method, and computer-readable storage medium configured to facilitate cash transactions at an Automated Teller Machine when an ATM card is not present. The system allows a customer of a first bank to use an ATM of a different bank and still facilitate the ATM transaction without an ATM card present.

48 Claims, 5 Drawing Sheets

Related U.S. Application Data continuation of application No. 16/700,681, filed on Dec. 2, 2019, now Pat. No. 10,867,294, which is a continuation of application No. 14/558,887, filed on Dec. 3, 2014, now Pat. No. 10,614,442.

(58) Field of Classification Search
USPC ..... 705/43, 39, 38, 37, 40, 26; 235/378, 379
See application file for complete search history.

(56) References Cited

U.S. PATENT DOCUMENTS

| | | |
|---|---|---|
| 6,286,756 B1 | 9/2001 | Stinson et al. |
| 6,636,833 B1 | 10/2003 | Flitcroft et al. |
| 7,076,458 B2 | 7/2006 | Lawlor et al. |
| 7,136,835 B1 | 11/2006 | Flitcroft et al. |
| 7,567,934 B2 | 7/2009 | Flitcroft et al. |
| 7,568,615 B2 | 8/2009 | Corona et al. |
| 7,571,142 B1 | 8/2009 | Flitcroft et al. |
| 7,593,896 B1 | 9/2009 | Flitcroft et al. |
| 7,686,213 B1 | 3/2010 | Ramachandran |
| 8,380,177 B2 | 2/2013 | Laracey |
| 8,632,000 B2 | 1/2014 | Laracey |
| 8,676,707 B2 | 3/2014 | Flitcroft et al. |
| 8,725,640 B2 | 5/2014 | Mateo Delgado et al. |
| 8,756,150 B2 | 6/2014 | Flitcroft et al. |
| 8,924,712 B2 | 12/2014 | Varadarajan et al. |
| 9,208,482 B2 | 12/2015 | Laracey |
| 9,305,295 B2 | 4/2016 | Laracey |
| 9,400,978 B2 | 7/2016 | Laracey |
| 9,401,077 B2 | 7/2016 | Laracey |
| 9,412,106 B2 | 8/2016 | Laracey |
| 9,639,837 B2 | 5/2017 | Laracey |
| 9,659,294 B2 | 5/2017 | Laracey |
| 9,721,248 B2 | 8/2017 | Bondesen et al. |
| 9,811,813 B2 | 11/2017 | Laracey |
| 9,911,120 B2 | 3/2018 | Laracey |
| 10,102,514 B2 | 10/2018 | Laracey |
| 10,115,088 B2 | 10/2018 | Laracey |
| 10,304,051 B2 | 5/2019 | Laracey |
| 2002/0026426 A1* | 2/2002 | Bennett ............... G07F 17/0014 705/64 |
| 2002/0152124 A1* | 10/2002 | Guzman ............... G07F 19/202 705/16 |
| 2006/0206709 A1 | 9/2006 | Labrou et al. |
| 2009/0024506 A1 | 1/2009 | Houri |
| 2009/0070260 A1 | 3/2009 | Flitcroft et al. |
| 2009/0078758 A1* | 3/2009 | Crowell ............... G06Q 20/305 235/380 |
| 2010/0041365 A1* | 2/2010 | Lott ..................... H04W 60/00 455/406 |
| 2010/0063905 A1 | 3/2010 | De Tena Sainz |
| 2010/0291895 A1* | 11/2010 | Drzyzga ............... G06Q 20/322 455/410 |
| 2011/0016047 A1 | 1/2011 | Wu et al. |
| 2011/0137795 A1* | 6/2011 | Nambiar ............... G06Q 20/40 235/379 |
| 2011/0238573 A1 | 9/2011 | Varadarajan |
| 2012/0226610 A1 | 9/2012 | Gill et al. |
| 2013/0218769 A1 | 8/2013 | Pourfallah et al. |
| 2013/0226799 A1 | 8/2013 | Raj |
| 2013/0246265 A1 | 9/2013 | Al-Sahli |
| 2013/0262303 A1 | 10/2013 | Metral |
| 2013/0268336 A1 | 10/2013 | Prideaux et al. |
| 2013/0311313 A1 | 11/2013 | Laracey |
| 2013/0339235 A1 | 12/2013 | Tulluri et al. |
| 2014/0040052 A1* | 2/2014 | Arthur ................. G06Q 20/322 705/16 |
| 2014/0108249 A1* | 4/2014 | Kulpati ............... G06Q 20/16 705/44 |
| 2014/0114855 A1 | 4/2014 | Bajaj et al. |
| 2014/0263618 A1 | 9/2014 | McCarthy et al. |
| 2015/0199671 A1 | 7/2015 | Bajaj et al. |
| 2016/0007840 A1 | 1/2016 | Boppart et al. |
| 2016/0063481 A1 | 3/2016 | Gupta et al. |
| 2016/0104146 A1 | 4/2016 | Peyton et al. |
| 2016/0162869 A1 | 6/2016 | Gupta et al. |
| 2016/0180322 A1 | 6/2016 | Song et al. |

FOREIGN PATENT DOCUMENTS

| | | |
|---|---|---|
| WO | WO-2015/029064 A2 | 3/2015 |
| WO | WO-2015/053470 A1 | 4/2015 |
| WO | WO-2015/054697 A1 | 4/2015 |
| WO | WO-2015/084755 A1 | 6/2015 |
| WO | WO-2015/172150 A1 | 11/2015 |
| WO | WO-2016/033513 A1 | 3/2016 |
| WO | WO-2016/089629 A1 | 6/2016 |
| WO | WO-2017/074665 A1 | 5/2017 |
| WO | WO-2018/005255 A1 | 1/2018 |
| WO | WO-2018/045134 A1 | 3/2018 |

OTHER PUBLICATIONS

A Safeguard against ATM Fraud; 2016 IEEE 6th International Conference on Advanced Computing (IACC) (pp. 701-705); Shweta Sankhwar, Dhirendra Pandey; Feb. 27, 2016. (Year: 2016).*

Betab et al: Fingerprints in Automated Teller Machine—A Survey, Apr. 2014, International Journal of Engineering and Advanced Technology (IJEAT), vol. 3, Issue 4, pp. 183-186 (2014).

Mallat et al., Mobile Banking Services, (2004) Nol. 47, No. 5, Communications of the ACM.. (Year: 2004).

International Search Report and Written Opinion dated Feb. 4, 2016 for application PCT/US2015/061945, which was filed on Nov. 20, 2015 and published as WO 2016/089629 on Jun. 9, 2016 (Inventor—Gupta, et al.; Applicant—MasterCard International, Inc.; (20 pages).

International Preliminary Report on Patentability dated Jun. 6, 2017 for application PCT/US2015/061945, which was filed on Nov. 20, 2015 and published as WO 2016/089629 on Jun. 9, 2016 (Inventor—Gupta, et al.; Applicant—MasterCard International, Inc.; (6 pages).

International Search Report and Written Opinion of the International Search Authority dated Jan. 14, 2016 for application PCT/US2015/047518, filed on Aug. 28, 2015 and published as WO 2016/033513 on Mar. 3, 2016 (Applicant—Mastercard Int'l, Inc. // Inventor—Knanchat, et al.).

International Preliminary Report on Patentability dated Feb. 28, 2017 for application PCT/US2015/047518, which was filed on Aug. 28, 2015 and published as WO 2016/033513 on Mar. 3, 2016 ( Inventor—Knanchat, et al.; Applicant—Mastercard International, Inc.; (8 pages).

International Search Report and Written Opinion dated Nov. 8, 2017 by the International Searching Authority for International Application No. PCT/US2017/049544, filed on Aug. 31, 2017 and published as WO 2018/045134 on Mar. 8, 2018 (Applicant—Mastercard International Inc.) (11 Pages).

International Preliminary Report on Patentability dated Mar. 5, 2019 by the International Searching Authority for International Application No. PCT/US2017/049544, filed on Aug. 31, 2017 and published as WO 2018/045134 on Mar. 8, 2018 (Applicant—Mastercard International Inc.) (8 Pages).

International Search Report and Written Opinion dated Jan. 5, 2017 by the International Searching Authority for International Application No. PCT/US2016/055457, filed on Oct. 5, 2016 and published as WO 2017/074665 on May 4, 2017 (Applicant—Mastercard International Inc.) (8 Pages).

International Preliminary Report on Patentability dated May 1, 2018 by the International Searching Authority for International Application No. PCT/US2016/055457, filed on Oct. 5, 2016 and published as WO 2017/074665 on May 4, 2017 (Applicant—Mastercard International Inc.) (6 Pages).

International Search Report and Written Opinion dated Sep. 27, 2017 by the International Searching Authority for International Application No. PCT/US2017/038896, filed on Jun. 23, 2017 and published as WO 2018/005255 on Jan. 4, 2018 (Applicant—Mastercard International Inc.) (10 Pages).

International Preliminary Report on Patentability dated Jan. 1, 2019 by the International Searching Authority for International Applica-

(56) References Cited

OTHER PUBLICATIONS tion No. PCT/US2017/038896, filed on Jun. 23, 2017 and published as WO 2018/005255 on Jan. 4, 2018 (Applicant—Mastercard International Inc.) (7 Pages).

Secure Authentication for ATM transactions using NFC technology; 2019 International Carnahan Conference on Security Technology (ICCST) (pp. 1-5); Divyans Mahansaria, Uttam Kumar Roy; Oct. 1, 2019. (Year: 2019).

Online franchise capturing using IPv6 through Automated Teller Machines; 2013 International Conference on Recent Trends in Information Technology (ICRTIT) (pp. 562-568); Kausal Malladi, Srivatsan Sridharan; Jul. 25, 2013. (Year: 2013).

* cited by examiner

SYSTEM AND METHOD OF FACILITATING CASH TRANSACTIONS AT AN ATM SYSTEM WITHOUT AN ATM CARD USING MOBILE

CROSS-REFERENCE TO RELATED PATENT APPLICATIONS

This application is a continuation of U.S. application Ser. No. 17/090,524, filed on Nov. 5, 2020, which is a continuation of U.S. application Ser. No. 16/700,681, filed on Dec. 2, 2019, and issued as U.S. Pat. No. 10,867,294, which is a continuation of U.S. application Ser. No. 14/558,887, filed on Dec. 3, 2014, and issued as U.S. Pat. No. 10,614,442, all of which are incorporated by reference in their entireties herein.

BACKGROUND

Aspects of the disclosure relate in general to financial services. Aspects include an apparatus, system, method and computer-readable storage medium to facilitate cash transactions at an Automated Teller Machine (ATM) when an ATM card is not present.

DESCRIPTION OF THE RELATED ART

An Automated Teller Machine or Automatic Teller Machine (ATM), also known as an Automated Banking Machine (ABM), or cash machine, is an electronic telecommunications device that enables the consumers of a financial institution to perform financial transactions without the need for a human cashier, clerk or bank teller.

On ATMs, the consumer is identified by inserting a plastic ATM card with a magnetic stripe or a plastic smart card with a chip that contains a unique card number and some security information such as an expiration date, card verification value code (CVVC), or card verification code (CVC or CVC2). Authentication is provided by the consumer entering a personal identification number (PIN) on the ATM key pad.

Using an ATM, consumers can access their bank deposit or credit accounts in order to make a variety of transactions such as cash withdrawals, check balances, or deposit cash. If the currency being withdrawn from the ATM is different from that in which the bank account is denominated, the money will be converted at an official exchange rate. Thus, ATMs often provide good foreign exchange rates for travelers, and are widely used for foreign exchange.

SUMMARY

Embodiments include a system, device, method and computer-readable medium to facilitate cash transactions at an Automated Teller Machine when an ATM card is not present. Embodiments are open loop, allowing a customer of a first bank to use an ATM of a different bank and still facilitate the ATM transaction without an ATM card present.

In a payment network method embodiment, payment network uses a mobile phone to facilitate cash transactions at an Automated Teller Machine when an ATM card is not present. A cash request is received by an acquirer from a network interface. The cash request contains a mobile number and an amount. A processor matches the mobile number with an entry in a database stored on a non-transitory computer-readable storage medium. The entry indicates an issuer associated with the mobile number. The network interface transmits the cash request to the issuer. A consumer Primary Account Number and an Accountholder Authentication Value (AAV) value are received from the issuer by the network interface. The network interface transmits the consumer Primary Account Number and the AAV value to the acquirer for further processing with the Issuer.

DETAILED DESCRIPTION

One aspect of the disclosure includes the realization that in many areas of the world many people do not have an ATM card, but may have a mobile phone.

Another aspect of the disclosure includes the understanding that a mobile phone may be used to verify the identity of a user at an Automated Teller Machine.

As used herein, the terms "consumer," "customer," and "cardholder" are synonymous, and designate users of an embodiment of the present disclosure. In such embodiments, consumers/customers are payment cardholders.

Embodiments of the present disclosure include a system, method, and computer-readable storage medium configured to use a mobile phone to facilitate cash transactions at an Automated Teller Machine when an ATM card is not present. Embodiments are open loop, allowing a customer of a first bank to use an ATM of a different bank and still facilitate the ATM transaction without an ATM card present. In one embodiment, a consumer is identified in an ATM transaction using a Mobile Station International Subscriber Directory Number (MSISDN), which is a number uniquely identifying a subscription in a GSM or a UMTS mobile network. The MSISDN is generally the telephone number to the SIM card in a mobile/cellular phone.

These and other aspects may be apparent in hindsight to one of ordinary skill in the art.

Figure 1:
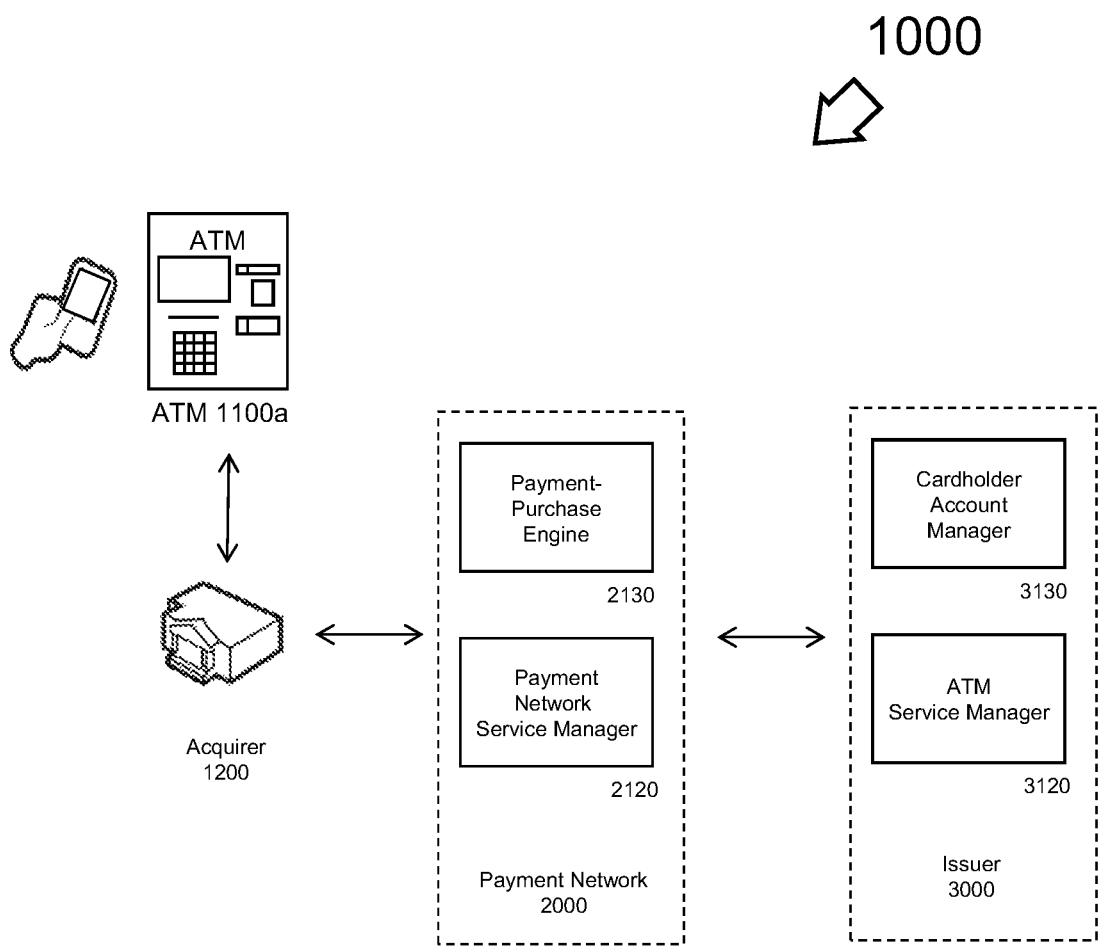
FIG. 1 depicts a system to facilitate cash transactions at an Automated Teller Machine when an ATM card is not present.

FIG. 1 depicts a system 1000 to facilitate cash transactions at an ATM when an ATM card is not present, constructed and operative in accordance with an embodiment of the present disclosure. System 1000 includes consumers using a plurality of computing devices to authenticate themselves at an Automated Teller Machine 1100 as part of a cash transaction.

The ATM 1100 is affiliated with a financial institution. This financial institution is usually called the "acquiring bank," "merchant bank" or "acquirer" 1200.

When a mobile phone is used at the ATM without an ATM card, the ATM 1100 electronically requests authorization from the acquirer 1200 for the transaction. In turn, acquirer 1200 communicates with the financial institution that issues the ATM card via a payment network.

Payment network 2000 is a network capable of processing payments electronically. An example payment network 2000 includes MasterCard International Incorporated of Purchase, N.Y. As described more elaborately in FIG. 2, payment network 2000 includes a payment-purchase engine 2130 and a payment network service manager 2120.

Figure 3:
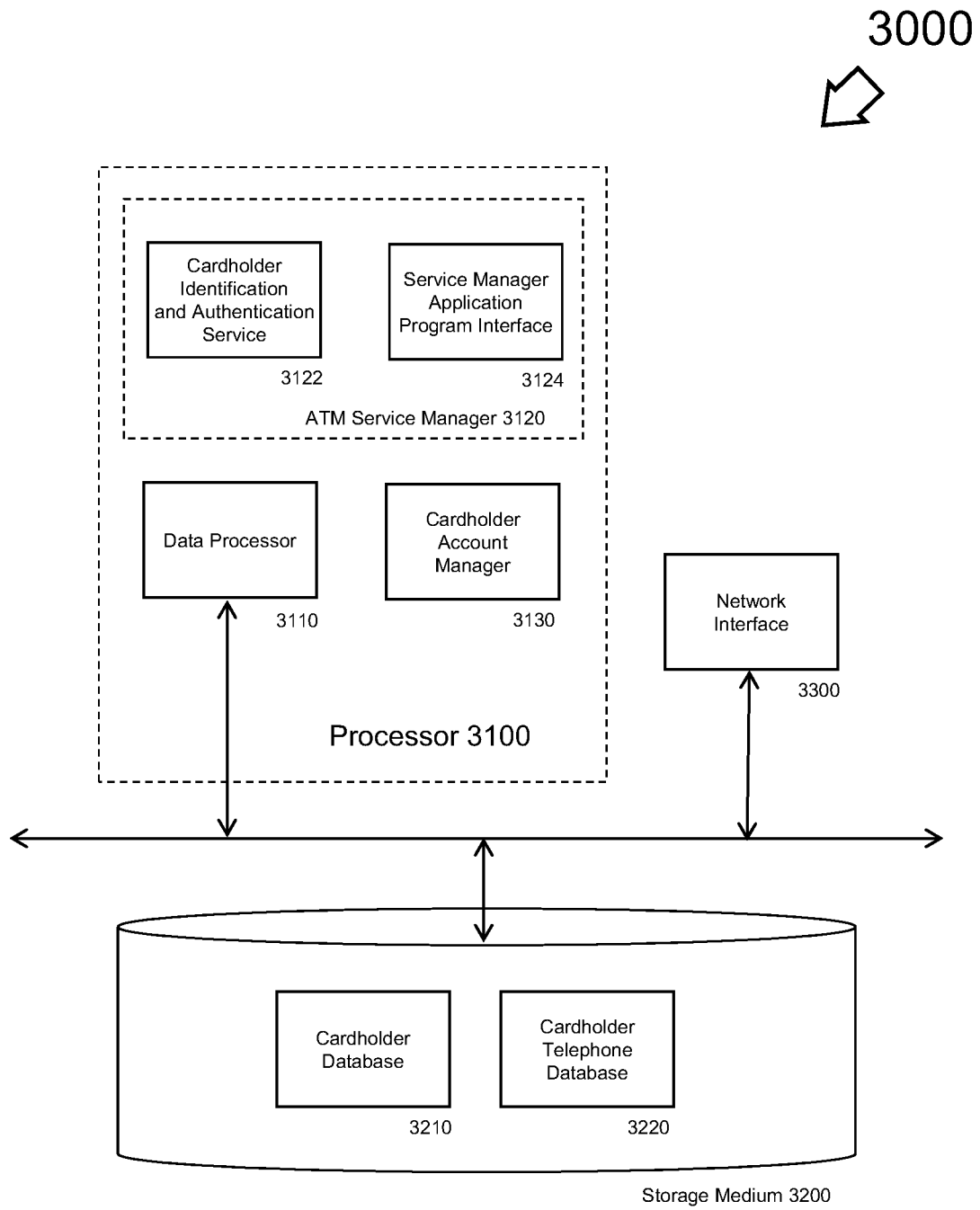
FIG. 3 is a block diagram of an issuer server configured to facilitate cash transactions at an ATM when an ATM card is not present.

The financial institution that issues the ATM card is called the "issuer bank" or "issuer 3000." As described more elaborately in FIG. 3, issuer 3000 includes a cardholder account manager 3130 and an ATM service manager 3120.

Figure 2:
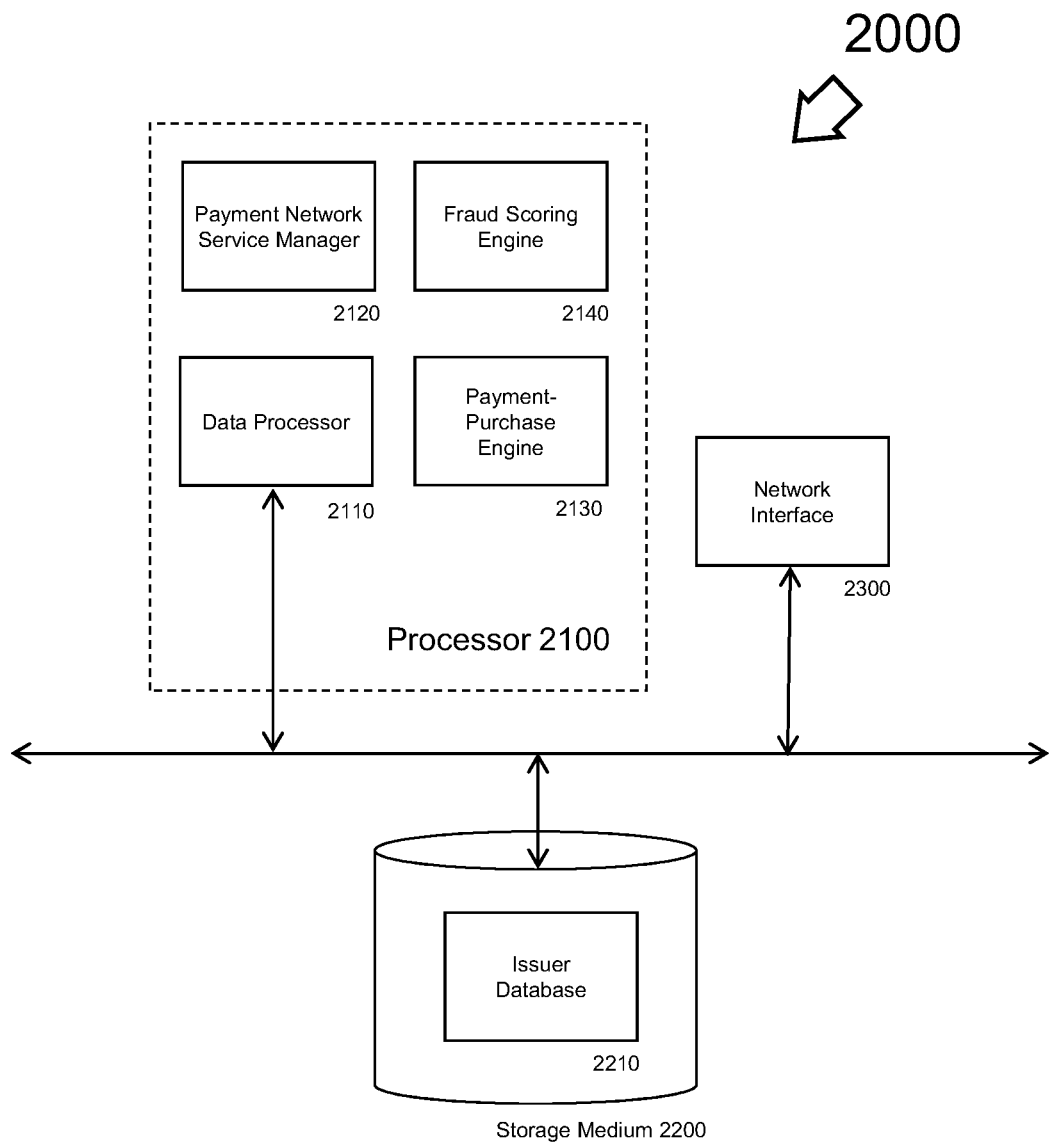
FIG. 2 is a block diagram of a payment network server configured to facilitate cash transactions at an ATM when an ATM card is not present.

Embodiments will now be disclosed with reference to a block diagram of an exemplary payment network 2000 of FIG. 2, constructed and operative in accordance with an embodiment of the present disclosure. Payment network 2000 is configured to facilitate cash transactions at an ATM when an ATM card is not present.

Payment network 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art.

It is well understood by those in the art, that the elements of FIG. 2 may be implemented as hardware, firmware, or as software instructions and data encoded on a non-transitory computer-readable storage medium 2200.

As shown in FIG. 2, processor 2100 is functionally comprised of a payment network service manager 2120, a fraud scoring engine 2140, a payment-purchase engine 2130 and a data processor 2110.

Payment network service manager 2120 is configured to facilitate communication and authentication of a customer using a mobile phone at an ATM with an issuer 3000.

Fraud scoring engine 2140 is a structure that scores financial transactions from acquirer 1200 for fraud. Fraud scoring engine 2140 may use decision tree logic, association rule learning, neural networks, inductive logic programming, support vector machines, clustering, Bayesian networks, reinforcement learning, representation learning, similarity and metric learning, spare dictionary learning, and ensemble methods such as random forest, boosting, bagging, and rule ensembles, or a combination thereof.

Payment-purchase engine 2130 may be any structure that facilitates payment from customer accounts at an issuer 3000, to an ATM 1100. The customer accounts may include payment card accounts, checking accounts, savings accounts and the like.

Data processor 2110 interfaces with Random Access Memory (RAM) (not shown), storage medium 2200 and network interface 2300. The data processor 2110 enables processor 2100 to locate data on, read data from, and write data to, these components.

These structures may be implemented as hardware, firmware, or software encoded on a computer readable medium, such as storage medium 2200. Further details of these components are described with their relation to method embodiments below.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment network 2000 to communicate with the customer mobile device, ATM 1100, acquirer 1200, or issuer 3000.

Computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain an issuer database 2210. Issuer database 2210 facilitates the look-up of issuers 3000 as described below.

The function of these structures may best be understood with respect to the flowcharts of FIGS. 4-5, as described below.

Embodiments will now be disclosed with reference to a block diagram of an exemplary issuer server 3000 of FIG. 3, constructed and operative in accordance with an embodiment of the present disclosure. Issuer server 3000 is configured to facilitate cash transactions at an ATM when an ATM card is not present.

Issuer server 3000 may run a multi-tasking operating system (OS) and include at least one processor or central processing unit (CPU) 3100, a non-transitory computer-readable storage medium 3200, and a network interface 3300.

Processor 3100 may be any central processing unit, microprocessor, micro-controller, computational device or circuit known in the art.

It is well understood by those in the art, that the elements of FIG. 3 may be implemented as hardware, firmware, or as software instructions and data encoded on a non-transitory computer-readable storage medium 3200.

As shown in FIG. 3, processor 3100 is functionally comprised of an ATM service manager 3120, a cardholder account manager 3130, and a data processor 3110.

ATM service manager 3120 is configured to facilitate communication and authentication of a customer using a mobile phone at an ATM with a payment network 2000. ATM service manager 3120 may further comprise: cardholder identification and authorization service 3122 and service manager application program interface 3124. Cardholder identification and authorization service 3122 is the structure that analyzes and communicates with the cardholder mobile device to authenticate a mobile telephone. Working in conjunction with network interface 3300, service manager application program interface 3124 is the structure that enables communication with payment network service manager 2120.

Cardholder account manager 3130 is the structure that manages cardholder accounts, and may do so using a cardholder database 3210 and cardholder telephone database 3220.

Data processor 3110 interfaces with Random Access Memory (not shown), storage medium 3200 and network interface 3300. The data processor 3110 enables processor 3100 to locate data on, read data from, and write data to, these components.

These structures may be implemented as hardware, firmware, or software encoded on a computer readable medium, such as storage medium 3200. Further details of these components are described with their relation to method embodiments below.

Network interface 3300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 3300 allows issuer server 3000 to communicate with the customer mobile device, ATM 1100, acquirer 1200, or payment network 2000.

Computer-readable storage medium 3200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 3200 may be remotely located from processor 3100, and be connected to processor 3100 via a network such as a local area network (LAN), a wide area network (WAN), or the Internet.

In addition, as shown in FIG. 3, storage medium 3200 may also contain a cardholder database 3210 and a cardholder telephone database 3220. Cardholder database 3210 is the structure that stores cardholder information, including cardholder account numbers, account balances, transaction history, available credit, and address information. Cardholder account numbers may include Primary Account Numbers (PANs) for ATM, credit, debit, or charge accounts. Cardholder telephone database is configured to store mobile telephone numbers associated with the cardholder.

It is understood by those familiar with the art that one or more of these databases 3210-3220 may be combined in a myriad of combinations. The function of these structures may best be understood with respect to the flowcharts of FIGS. 4-5, as described below.

Figure 4:
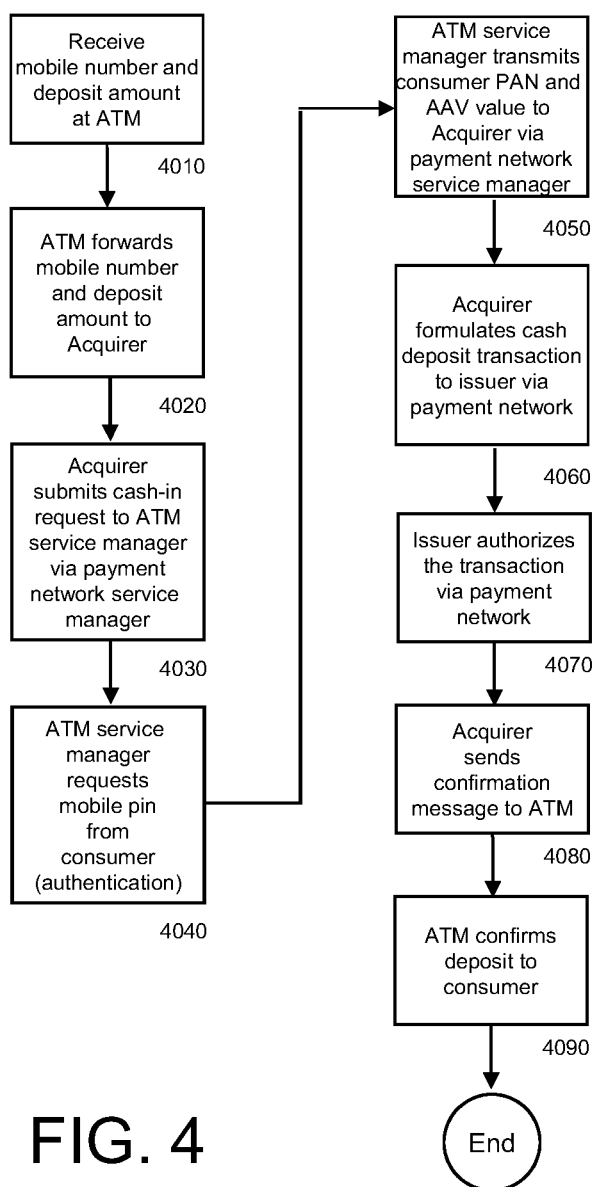
FIG. 4 is a flow chart of a method of performing a cash deposit ("cash-in") transaction at an ATM when an ATM card is not present.

FIG. 4 is a flow chart of a method 4000 of performing a cash deposit ("cash-in") transaction at an ATM when an ATM card is not present, constructed and operative in accordance with an embodiment of the present disclosure. In such an embodiment, the customer pre-registers their mobile number with the issuer 3000, and this information has been provided to payment network 2000, and is stored in issuer database 2210.

In method 4000, a customer deposits cash at an ATM when an ATM card is not present. At block 4010, instead of inserting an ATM card into the ATM, during the authentication phase, each cardholder enters their registered mobile number (MSISDN) into the ATM keypad. The cardholder then deposits the cash into the ATM, which is either counted by the ATM or the cardholder keys in the amount deposited. The mobile number, the amount of cash deposited, and an identifier for the ATM are transmitted to the acquirer 1200, block 4020.

The acquirer 1200 submits a cash-in request to the ATM service manager 3120, via the payment network service manager 2120, block 4030. The cash-in request includes the mobile number, the amount deposited, and ATM identifier. The payment network service manager 2120 is able to route ATM service manager 3120 by matching the registered telephone number with the issuer 3000.

ATM service manager 3120 matches the mobile number with a cardholder by performing a database match with cardholder telephone database 3220. The resulting database entry matches the mobile number with the cardholder and a mobile PIN (m-PIN). At block 4040, ATM service manager 3120 requests the mobile PIN from the customer's mobile phone or ATM. The ATM Service Manager 3120 is either directly capable of generating a smart Short Message Service (SMS) or via the service manager application program interface 3124. The service manager application program interface 3124 includes a SMS generator engine; a smart SMS challenge is sent to the consumer over the cellular network. The consumer receives this smart SMS which invokes the mobile app on the consumer's mobile phone. It is within this mobile application in which the consumer needs to enter the Mobile PIN. Once the consumer enters the mobile pin, the mobile PIN is encrypted and sent back to the ATM Service Manager 3120 over the cellular network for authentication.

If the m-PIN is incorrect, process 4000 stops.

If the correct m-PIN is received, the customer is authenticated, and the process continues.

ATM service manager 3120 transmits the consumer PAN and Accountholder Authentication Value (AAV) value to the acquirer 1200 via the payment network service manager 2120, block 4050.

The acquirer 1200 is then able to formulate the cash deposit transaction to the issuer 3000 via payment network 2000, block 4060. In one embodiment, the cash deposit transaction is formulated as an ISO message.

Issuer 3000 authorizes the transaction via payment network 2000, block 4070.

Acquirer then sends the confirmation to ATM 1100, block 4080.

The ATM then confirms the deposit to the customer, block 4090, and process 4000 ends.

Figure 5:
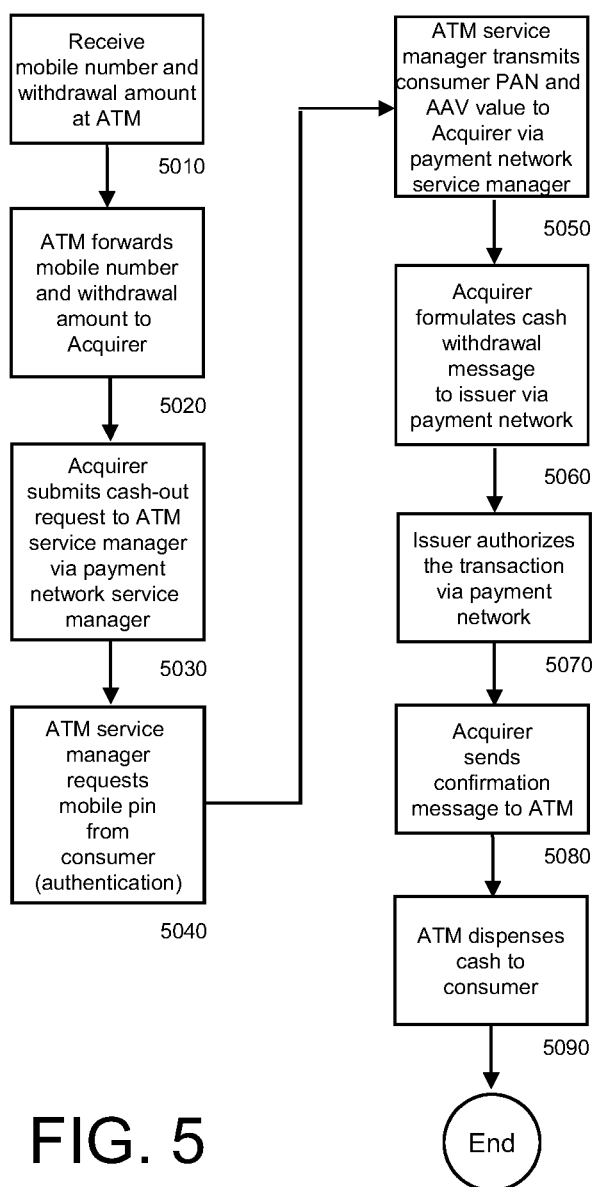
FIG. 5 is a flow chart of a method of performing a cash withdrawal ("cash-out") transaction at an ATM when an ATM card is not present.

FIG. 5 is a flow chart of a method of performing a cash withdrawal ("cash-out") transaction at an ATM when an ATM card is not present, constructed and operative in accordance with an embodiment of the present disclosure. In such an embodiment, the customer pre-registers their mobile number with the issuer 3000, and this information has been provided to payment network 2000, and is stored in issuer database 2210.

In method 5000, a customer is making a cash withdrawal at an ATM when an ATM card is not present. At block 5010, instead of inserting an ATM card into the ATM, during the authentication phase, each cardholder enters their registered mobile number (MSISDN) into the ATM keypad. The cardholder keys in the amount to be withdrawn. The mobile number, the withdrawal amount, and an identifier for the ATM are transmitted to the acquirer 1200, block 5020.

The acquirer submits a cash-out request to the ATM service manager 3120, via the payment network service manager 2120, block 5030. The cash withdrawal request includes the mobile number, the withdrawal amount, and ATM identifier.

At block 5040, ATM service manager 3120 requests a mobile PIN (m-PIN) from the customer's mobile phone or ATM. The ATM Service Manager 3120 is either directly capable of generating a smart Short Message Service (SMS) or via the service manager application program interface 3124. The service manager application program interface 3124 includes a SMS generator engine; a smart SMS challenge is sent to the consumer over the cellular network. The consumer receives this smart SMS which invokes the mobile app on the consumer's mobile phone. It is within this mobile application in which the consumer needs to enter the Mobile PIN. Once the consumer enters the mobile pin, the mobile PIN is encrypted and sent back to the ATM Service Manager 3120 over the cellular network for authentication.

If the m-PIN is incorrect, process 5000 stops.

If the correct m-PIN is received, the customer is authenticated, and the process continues.

ATM service manager 3120 transmits the consumer PAN and AAV value to the acquirer via the payment network service manager 2120, block 5050.

The acquirer 1200 is then able to formulate a cash withdrawal transaction to the issuer 3000 via payment network 2000, block 5060.

Issuer 3000 authorizes the transaction via payment network 2000, block 5070.

Acquirer then sends the confirmation to ATM 1100, block 5080.

The ATM then dispenses the withdrawal amount in cash to the customer, block 5090, and process 5000 ends.

The previous description of the embodiments is provided to enable any person skilled in the art to practice the disclosure. The generic principles defined herein may be applied to other embodiments. Thus, the present disclosure is not intended to be limited to the embodiments shown herein, but is to be accorded the widest scope consistent with the principles and features disclosed herein.

What is claimed is:

1. An apparatus comprising:
   one or more processors; and
   memory storing processor executable instructions that, when executed by the one or more processors, cause the apparatus to:
   receive a message from a computing device associated with an issuer network, wherein the computing device sends the message in response to receiving an account authorization request associated with a transaction at an Automated Teller Machine (ATM) in communication with an acquirer network;
   cause, in response to receiving the message, a user interface element to be displayed, wherein the user interface element is configured to allow a user associated with a mobile number to enter a mobile personal identification number (m-PIN);
   receive, at the user interface element, them-PIN, wherein them-PIN is associated with a Primary Account Number (PAN) and the mobile number; and
   send, to the computing device, in response to receiving them-PIN via the user interface element, an encrypted message comprising them-PIN, wherein the computing device, in response to receiving the encrypted message, sends the PAN and an indication that the user is authenticated to another computing device associated with the acquirer network.

2. The apparatus of claim 1, wherein the transaction comprises one of:
   a withdrawal request comprising a withdrawal amount or a deposit request comprising a deposit amount.

3. The apparatus of claim 1, wherein the processor executable instructions further cause the apparatus to:
   receive the mobile number and an amount associated with the transaction;
   send, in response to receiving the mobile number and the amount, the account authorization request comprising the mobile number and the amount;
   receive the PAN and the indication that the user is authenticated;
   send a cash transaction request comprising the PAN and the amount receive a confirmation message indicative of an authorization of the cash transaction request; and
   cause, based on the confirmation message, the amount to be dispensed.

4. The apparatus of claim 1, wherein the processor executable instructions further cause the apparatus to:
   receive the account authorization request, the mobile number, and an amount associated with the transaction;
   determine, based on the mobile number, a personal identification number (PIN) and the PAN;
   receive the encrypted message, wherein the encrypted message comprises the PIN;
   send the PAN and the indication that the user is authenticated;
   receive a cash transaction request comprising the PAN and the amount; and
   send a confirmation message indicative of an authorization of the cash transaction request.

5. A non-transitory computer readable medium storing processor executable instructions that, when executed by at least one processor, cause the at least one processor to:
   receive a message from a computing device associated with an issuer network, wherein the computing device sends the message in response to receiving an account authorization request associated with a transaction at an Automated Teller Machine (ATM) in communication with an acquirer network;
   cause, in response to receiving the message, a user interface element to be displayed, wherein the user interface element is configured to allow a user associated with a mobile number to enter a mobile personal identification number (m-PIN);
   receive, at the user interface element, them-PIN, wherein them-PIN is associated with a Primary Account Number (PAN) and the mobile number; and
   send, to the computing device, in response to receiving them-PIN via the user interface element, an encrypted message comprising them-PIN, wherein the computing device, in response to receiving the encrypted message, sends the PAN and an indication that the user is authenticated to another computing device associated with the acquirer network.

6. The non-transitory computer readable medium of claim 5, wherein the transaction comprises one of:
   a withdrawal request comprising a withdrawal amount or a deposit request comprising a deposit amount.

7. The non-transitory computer readable medium of claim 5, wherein the processor executable instructions further cause the at least one processor to:
   receive the mobile number and an amount associated with the transaction;
   send, in response to receiving the mobile number and the amount, the account authorization request comprising the mobile number and the amount;
   receive the PAN and the indication that the user is authenticated;
   send a cash transaction request comprising the PAN and the amount;
   receive a confirmation message indicative of an authorization of the cash transaction request; and
   cause, based on the confirmation message, the amount to be dispensed.

8. The non-transitory computer readable medium of claim 5, wherein the processor executable instructions further cause the at least one processor to:

receive the account authorization request, the mobile number, and an amount associated with the transaction;
determine, based on the mobile number, a personal identification number (PIN) and the PAN;
receive the encrypted message, wherein the encrypted message comprises the PIN; send the PAN and the indication that the user is authenticated;
receive a cash transaction request comprising the PAN and the amount; and
send a confirmation message indicative of an authorization of the cash transaction request.

9. An apparatus comprising:
one or more processors; and
memory storing processor executable instructions that, when executed by the one or more processors, cause the apparatus to:
receive a mobile number and an amount;
send, to a computing device associated with an acquirer network, in response to receiving the mobile number and the amount, an account authorization request comprising the mobile number and the amount;
receive, from the computing device, a Primary Account Number (PAN) associated with the mobile number and an indication that the PAN is authenticated, wherein the computing device sends the PAN and the indication in response to receiving, via a mobile device associated with the mobile number, an encrypted message comprising a mobile personal identification number (m-PIN);
send, to the computing device, a cash transaction request comprising the PAN and the amount;
receive, from the computing device, a confirmation message indicative of an authorization of the cash transaction request; and
cause, based on the confirmation message, the amount to be dispensed.

10. The apparatus of claim 9, wherein the cash transaction request comprises one of:
a withdrawal request comprising a withdrawal amount or a deposit request comprising a deposit amount.

11. The apparatus of claim 9, wherein the mobile device:
receives a message from a computing device associated with an issuer network, wherein the computing device associated with the issuer network sends the message in response to receiving the account authorization request;
causes, in response to receiving the message, a user interface element to be displayed, wherein the user interface element is configured to allow a user of the mobile device to enter the m-PIN;
receives, at the user interface element, the m-PIN, wherein the m-PIN is associated with the PAN and the mobile number; and
sends, in response to receiving the m-PIN via the user interface element, the encrypted message, wherein the computing device associated with the issuer network sends, in response to receiving the encrypted message, the PAN and the indication that the PAN is authenticated.

12. The apparatus of claim 9, wherein a computing device associated with an issuer network:
receives the account authorization request, a number associated with the mobile device, and the amount;
determines, based on the number, a personal identification number (PIN) and the PAN;
receives, from the computing device, the encrypted message, wherein the encrypted message comprises the PIN.

13. The apparatus of claim 9, wherein a computing device associated with an issuer network:
receives the account authorization request, a number associated with the mobile device, and the amount;
determines, based on the number, a personal identification number (PIN) and the PAN;
receives, from the computing device, the encrypted message, wherein the encrypted message comprises the PIN.

14. A non-transitory computer readable medium storing processor executable instructions that, when executed by at least one processor, cause the at least one processor to:
receive a mobile number and an amount;
send, to a computing device associated with an acquirer network, in response to receiving the mobile number and the amount, an account authorization request comprising the mobile number and the amount;
receive, from the computing device, a Primary Account Number (PAN) associated with the mobile number and an indication that the PAN is authenticated, wherein the computing device sends the PAN and the indication in response to receiving, via a mobile device associated with the mobile number, an encrypted message comprising a mobile personal identification number (m-PIN);
send, to the computing device, a cash transaction request comprising the PAN and the amount;
receive, from the computing device, a confirmation message indicative of an authorization of the cash transaction request; and
cause, based on the confirmation message, the amount to be dispensed.

15. The non-transitory computer readable medium of claim 14, wherein the cash transaction request comprises one of:
a withdrawal request comprising a withdrawal amount or a deposit request comprising a deposit amount.

16. The non-transitory computer readable medium of claim 14, wherein the mobile device:
receives a message from a computing device associated with an issuer network, wherein the computing device associated with the issuer network sends the message in response to receiving the account authorization request;
causes, in response to receiving the message, a user interface element to be displayed, wherein the user interface element is configured to allow a user of the mobile device to enter the m-PIN;
receives, at the user interface element, the m-PIN, wherein the m-PIN is associated with the PAN and the mobile number; and
sends, in response to receiving the m-PIN via the user interface element, the encrypted message, wherein the computing device associated with the issuer network sends, in response to receiving the encrypted message, the PAN and the indication that the PAN is authenticated.

17. The non-transitory computer readable medium of claim 14, wherein a computing device associated with an issuer network:
receives the account authorization request, a number associated with the mobile device, and the amount;
determines, based on the number, a personal identification number (PIN) and the PAN;
receives, from the computing device, the encrypted message, wherein the encrypted message comprises the PIN.

18. The non-transitory computer readable medium of claim 14, wherein the cash transaction request comprises one of:
   a withdrawal request comprising a withdrawal amount or a deposit request comprising a deposit amount.

19. The non-transitory computer readable medium of claim 14, wherein the mobile device:
   receives a message from a computing device associated with an issuer network, wherein the computing device associated with the issuer network sends the message in response to receiving the account authorization request;
   causes, in response to receiving the message, a user interface element to be displayed, wherein the user interface element is configured to allow a user of the mobile device to enter the m-PIN;
   receives, at the user interface element, the m-PIN, wherein the m-PIN is associated with the PAN and the mobile number; and
   sends, in response to receiving the m-PIN via the user interface element, the encrypted message, wherein the computing device associated with the issuer network sends, in response to receiving the encrypted message, the PAN and the indication that the PAN is authenticated.

20. The non-transitory computer readable medium of claim 14, wherein a computing device associated with an issuer network:
   receives the account authorization request, a number associated with the mobile device, and the amount;
   determines, based on the number, a personal identification number (PIN) and the PAN;
   receives, from the computing device, the encrypted message, wherein the encrypted message comprises the PIN.

21. An apparatus comprising:
   one or more processors; and
   memory storing processor executable instructions that, when executed by the one or more processors, cause the apparatus to:
   receive, from a computing device associated with an acquirer network, an account authorization request comprising:
   a mobile number associated with a mobile device, and
   an amount associated with a cash transaction request at an Automated Teller Machine (ATM) in communication with the acquirer network;
   determine, based on the mobile number, a personal identification number (PIN) and a Primary Account Number (PAN) associated with the mobile device;
   send, to the computing device, the PIN;
   receive, from the computing device, an encrypted message generated by the ATM, wherein the encrypted message comprises the PIN;
   send, to the computing device, based on the encrypted message comprising the PIN, the PAN and an indication that the PAN is authenticated;
   receive, from the computing device, the cash transaction request comprising the PAN and the amount; and
   send, to the computing device, a confirmation message indicative of an authorization of the cash transaction request, wherein the computing device transmits the confirmation message, upon receipt, to the ATM.

22. The apparatus of claim 21, wherein the cash transaction request is at least one of:
   a withdrawal request comprising a withdrawal amount or a deposit request comprising a deposit amount.

23. The apparatus of claim 21, wherein the mobile device:
   receives a message from the computing device, wherein the computing device sends the message in response to receiving the account authorization request;
   causes, in response to receiving the message, a user interface element to be displayed, wherein the user interface element is configured to allow a user of the mobile device to enter a mobile personal identification number (m-PIN);
   receives, at the user interface element, the m-PIN, wherein the m-PIN is associated with the PAN and the mobile number; and
   sends, in response to receiving the m-PIN via the user interface element, the encrypted message, wherein the encrypted message comprises the m-PIN.

24. The apparatus of claim 21, wherein the ATM:
   receives the mobile number and the amount;
   sends, in response to receiving the mobile number and the amount, the account authorization request, wherein the account authorization request comprises the mobile number and the amount;
   receives the PAN and the indication that the PAN is authenticated; sends the cash transaction request;
   receives the confirmation message; and
   causes, based on the confirmation message, the amount to be dispensed.

25. The apparatus of claim 21, wherein the cash transaction request is at least one of:
   a withdrawal request comprising a withdrawal amount or a deposit request comprising a deposit amount.

26. The apparatus of claim 21, wherein the mobile device:
   receives a message from the computing device, wherein the computing device sends the message in response to receiving the account authorization request;
   causes, in response to receiving the message, a user interface element to be displayed, wherein the user interface element is configured to allow a user of the mobile device to enter a mobile personal identification number (m-PIN);
   receives, at the user interface element, the m-PIN, wherein the m-PIN is associated with the PAN and the mobile number; and
   sends, in response to receiving the m-PIN via the user interface element, the encrypted message, wherein the encrypted message comprises the m-PIN.

27. The apparatus of claim 21, wherein the ATM:
   receives the mobile number and the amount;
   sends, in response to receiving the mobile number and the amount, the account authorization request, wherein the account authorization request comprises the mobile number and the amount;
   receives the PAN and the indication that the PAN is authenticated; sends the cash transaction request;
   receives the confirmation message; and
   causes, based on the confirmation message, the amount to be dispensed.

28. The apparatus of claim 21, wherein the mobile device:
   receives a message from the computing device, wherein the computing device sends the message in response to receiving the account authorization request;
   causes, in response to receiving the message, a user interface element to be displayed, wherein the user interface element is configured to allow a user of the mobile device to enter a mobile personal identification number (m-PIN);

receives, at the user interface element, them-PIN, wherein them-PIN is associated with the PAN and the mobile number; and
sends, in response to receiving them-PIN via the user interface element, the encrypted message, wherein the encrypted message comprises them-PIN.

29. The apparatus of claim 21, wherein the ATM:
receives the mobile number and the amount;
sends, in response to receiving the mobile number and the amount, the account authorization request, wherein the account authorization request comprises the mobile number and the amount;
receives the PAN and the indication that the PAN is authenticated; sends the cash transaction request;
receives the confirmation message; and
causes, based on the confirmation message, the amount to be dispensed.

30. A non-transitory computer readable medium storing processor executable instructions that, when executed by at least one processor, cause the at least one processor to:
receive a mobile number and an amount;
send, to a computing device associated with an acquirer network, in response to receiving the mobile number and the amount, an account authorization request comprising the mobile number and the amount;
receive, from the computing device, a Primary Account Number (PAN) associated with the mobile number and an indication that the PAN is authenticated, wherein the computing device sends the PAN and the indication in response to receiving, via a mobile device associated with the mobile number, an encrypted message comprising a mobile personal identification number (m-PIN);
send, to the computing device, a cash transaction request comprising the PAN and the amount;
receive, from the computing device, a confirmation message indicative of an authorization of the cash transaction request; and
cause, based on the confirmation message, the amount to be dispensed.

31. An apparatus comprising:
one or more processors; and
memory storing processor executable instructions that, when executed by the one or more processors, cause the apparatus to:
receive, from a computing device associated with an acquirer network, an account authorization request comprising:
a mobile number associated with a mobile device, and
an amount associated with a cash transaction request at an Automated Teller Machine (ATM) in communication with the acquirer network;
determine, based on the mobile number, a personal identification number (PIN) and a Primary Account Number (PAN) associated with the mobile device;
send, to the computing device, the PIN;
receive, from the computing device, an encrypted message generated by the ATM, wherein the encrypted message comprises the PIN;
send, to the computing device, based on the encrypted message comprising the PIN, the PAN and an indication that the PAN is authenticated;
receive, from the computing device, the cash transaction request comprising the PAN and the amount; and
send, to the computing device, a confirmation message indicative of an authorization of the cash transaction request, wherein the computing device transmits the confirmation message, upon receipt, to the ATM.

32. A non-transitory computer readable medium storing processor executable instructions that, when executed by at least one processor, cause the at least one processor to:
receive, from a computing device associated with an acquirer network, an account authorization request comprising:
a mobile number associated with a mobile device, and
an amount associated with a cash transaction request at an Automated Teller Machine (ATM) in communication with the acquirer network;
determine, based on the mobile number, a personal identification number (PIN) and a Primary Account Number (PAN) associated with the mobile device;
send, to the computing device, the PIN;
receive, from the computing device, an encrypted message generated by the ATM, wherein the encrypted message comprises the PIN;
send, to the computing device, based on the encrypted message comprising the PIN, the PAN and an indication that the PAN is authenticated;
receive, from the computing device, the cash transaction request comprising the PAN and the amount; and
send, to the computing device, a confirmation message indicative of an authorization of the cash transaction request, wherein the computing device transmits the confirmation message, upon receipt, to the ATM.

33. An apparatus comprising:
one or more processors; and
memory storing processor executable instructions that, when executed by the one or more processors, cause the apparatus to:
receive a mobile number and an amount, wherein the mobile number and the amount are entered by a user;
send, to a computing device of an acquirer network, in response to receiving the mobile number and the amount, an account authorization request comprising the mobile number and the amount;
receive, from the computing device of the acquirer network, a confirmation message indicative of an authorization of the cash transaction request; and
cause, based on the confirmation message, the amount to be dispensed.

34. The apparatus of claim 33, wherein the cash transaction request comprises one of:
a withdrawal request comprising a withdrawal amount or a deposit request comprising a deposit amount.

35. The apparatus of claim 33, wherein the mobile device:
receives a Short Message Service (SMS) message from a computing device of an issuer network, wherein the computing device of the issuer network sends the SMS message in response to receiving the account authorization request;
causes, in response to receiving the SMS message, a user interface element to be displayed, wherein the user interface element is configured to allow the user to enter them-PIN;
receives, at the user interface element, them-PIN, wherein them-PIN is associated with the PAN and the mobile number; and
sends, to the computing device of the issuer network, in response to receiving them-PIN via the user interface element, the encrypted message comprising them-PIN, wherein the computing device of the issuer network, in response to receiving the encrypted message comprising them-PIN, sends the PAN and the indication that the user is authenticated to the computing device of the acquirer network.

36. The apparatus of claim 33, wherein a computing device of an issuer network:
   receives the account authorization request, a number associated with the mobile device, and the amount, wherein the number is entered at an automated teller machine (ATM);
   determines, based on the number and a customer database, a personal identification number (PIN) and the PAN, wherein the PIN and the PAN are stored in the customer database;
   sends, to the computing device of the acquirer network, a message configured to cause the ATM, upon receipt of the message, to prompt the user to enter the PIN at the ATM;
   receives, from the computing device of the acquirer network, the encrypted message generated by the ATM, wherein the encrypted message comprises the PIN;
   sends, to the computing device of the acquirer network, the indication that the user is authenticated and the PAN;
   receives, from the computing device of the acquirer network, the cash transaction request; and
   sends, to the computing device of the acquirer network, the confirmation message.

37. A non-transitory computer readable medium storing processor executable instructions that, when executed by at least one processor, cause the at least one processor to:
   receive a mobile number and an amount, wherein the mobile number and the amount are entered by a user;
   send, to a computing device of an acquirer network, in response to receiving the mobile number and the amount, an account authorization request comprising the mobile number and the amount;
   receive, from the computing device of the acquirer network, a Primary Account Number (PAN) associated with the mobile number and an indication that the user is authenticated, wherein the computing device of the acquirer network sends the PAN and the indication in response to receiving, via a mobile device associated with the mobile number, an encrypted message comprising a mobile personal identification number (m-PIN);
   send, to the computing device of the acquirer network, a cash transaction request comprising the PAN and the amount;
   receive, from the computing device of the acquirer network, a confirmation message indicative of an authorization of the cash transaction request; and
   cause, based on the confirmation message, the amount to be dispensed.

38. The non-transitory computer readable medium of claim 37, wherein the cash transaction request comprises one of:
   a withdrawal request comprising a withdrawal amount or a deposit request comprising a deposit amount.

39. The non-transitory computer readable medium of claim 37, wherein the mobile device:
   receives a Short Message Service (SMS) message from a computing device of an issuer network, wherein the computing device of the issuer network sends the SMS message in response to receiving the account authorization request;
   causes, in response to receiving the SMS message, a user interface element to be displayed, wherein the user interface element is configured to allow the user to enter them-PIN;
   receives, at the user interface element, them-PIN, wherein them-PIN is associated with the PAN and the mobile number; and
   sends, to the computing device of the issuer network, in response to receiving them-PIN via the user interface element, the encrypted message comprising them-PIN, wherein the computing device of the issuer network, in response to receiving the encrypted message comprising them-PIN, sends the PAN and the indication that the user is authenticated to the computing device of the acquirer network.

40. The non-transitory computer readable medium of claim 37, wherein a computing device of an issuer network:
   receives the account authorization request, a number associated with the mobile device, and the amount, wherein the number is entered at an automated teller machine (ATM);
   determines, based on the number and a customer database, a personal identification number (PIN) and the PAN, wherein the PIN and the PAN are stored in the customer database;
   sends, to the computing device of the acquirer network, a message configured to cause the ATM, upon receipt of the message, to prompt the user to enter the PIN at the ATM;
   receives, from the computing device of the acquirer network, the encrypted message generated by the ATM, wherein the encrypted message comprises the PIN;
   sends, to the computing device of the acquirer network, the indication that the user is authenticated and the PAN;
   receives, from the computing device of the acquirer network, the cash transaction request; and
   sends, to the computing device of the acquirer network, the confirmation message.

41. An apparatus comprising:
   one or more processors; and
   memory storing processor executable instructions that, when executed by the one or more processors, cause the apparatus to:
   receive, from a computing device of an acquirer network, an account authorization request comprising a number associated with a mobile device and an amount, wherein the number and the amount are entered at an Automated Teller Machine (ATM) in communication with the acquirer network by a user of the ATM;
   determine, based on the number and a customer database, a personal identification number (PIN) and a Primary Account Number (PAN) associated with the mobile device, wherein the PIN and the PAN are stored in the customer database;
   send, to the computing device of the acquirer network, a message configured to cause the ATM, upon receipt of the message, to prompt the user to enter the PIN at the ATM;
   receive, from the computing device of the acquirer network, an encrypted message generated by the ATM, wherein the encrypted message comprises the PIN;
   send, to the computing device of the acquirer network, based on the encrypted message comprising the PIN, an indication that the user is authenticated and the PAN;

receive, from the computing device of the acquirer network, a cash transaction request comprising the PAN and the amount; and send, to the computing device of the acquirer network, a confirmation message indicative of an authorization of the cash transaction request, wherein the computing device of the acquirer network transmits the confirmation message, upon receipt, to the ATM.

42. The apparatus of claim 41, wherein the cash transaction request comprises one of:

a withdrawal request comprising a withdrawal amount or a deposit request comprising a deposit amount.

43. The apparatus of claim 41, wherein the mobile device:

receives a Short Message Service (SMS) message from the computing device of an issuer network, wherein the computing device of the issuer network sends the SMS message in response to receiving the account authorization request;

causes, in response to receiving the SMS message, a user interface element to be displayed, wherein the user interface element is configured to allow the user to enter a mobile personal identification number (m-PIN);

receives, at the user interface element, the m-PIN, wherein the m-PIN is associated with the PAN and a mobile number; and sends, to the computing device of the issuer network, in response to receiving the m-PIN via the user interface element, the encrypted message, wherein the encrypted message comprises the m-PIN.

44. The apparatus of claim 41, wherein the ATM:

receives a mobile number associated with the mobile device and the amount;

sends, to the computing device of the acquirer network, in response to receiving the mobile number and the amount, the account authorization request, wherein the account authorization request comprises the mobile number and the amount;

receives, from the computing device of the acquirer network, the PAN and the indication that the user is authenticated;

sends, to the computing device of the acquirer network, the cash transaction request; receives, from the computing device of the acquirer network, the confirmation message; and causes, based on the confirmation message, the amount to be dispensed.

45. A non-transitory computer readable medium storing processor executable instructions that, when executed by at least one processor, cause the at least one processor to:

receive, from a computing device of an acquirer network, an account authorization request comprising a number associated with a mobile device and an amount, wherein the number and the amount are entered at an Automated Teller Machine (ATM) in communication with the acquirer network by a user of the ATM;

determine, based on the number and a customer database, a personal identification number (PIN) and a Primary Account Number (PAN) associated with the mobile device, wherein the PIN and the PAN are stored in the customer database;

send, to the computing device of the acquirer network, a message configured to cause the ATM, upon receipt of the message, to prompt the user to enter the PIN at the ATM;

receive, from the computing device of the acquirer network, an encrypted message generated by the ATM, wherein the encrypted message comprises the PIN;

send, to the computing device of the acquirer network, based on the encrypted message comprising the PIN, an indication that the user is authenticated and the PAN;

receive, from the computing device of the acquirer network, a cash transaction request comprising the PAN and the amount; and send, to the computing device of the acquirer network, a confirmation message indicative of an authorization of the cash transaction request, wherein the computing device of the acquirer network transmits the confirmation message, upon receipt, to the ATM.

46. The non-transitory computer readable medium of claim 45, wherein the cash transaction request comprises one of:

a withdrawal request comprising a withdrawal amount or a deposit request comprising a deposit amount.

47. The non-transitory computer readable medium of claim 45, wherein the mobile device:

receives a Short Message Service (SMS) message from the computing device of an issuer network, wherein the computing device of the issuer network sends the SMS message in response to receiving the account authorization request;

causes, in response to receiving the SMS message, a user interface element to be displayed, wherein the user interface element is configured to allow the user to enter a mobile personal identification number (m-PIN);

receives, at the user interface element, the m-PIN, wherein the m-PIN is associated with the PAN and a mobile number; and sends, to the computing device of the issuer network, in response to receiving the m-PIN via the user interface element, the encrypted message, wherein the encrypted message comprises the m-PIN.

48. The non-transitory computer readable medium of claim 45, wherein the ATM:

receives a mobile number associated with the mobile device and the amount; sends, to the computing device of the acquirer network, in response to receiving the mobile number and the amount, the account authorization request, wherein the account authorization request comprises the mobile number and the amount;

receives, from the computing device of the acquirer network, the PAN and the indication that the user is authenticated;

sends, to the computing device of the acquirer network, the cash transaction request;

receives, from the computing device of the acquirer network, the confirmation message; and causes, based on the confirmation message, the amount to be dispensed.

* * * * *